United States Patent
Hao et al.

(10) Patent No.: US 11,010,094 B2
(45) Date of Patent: May 18, 2021

(54) TASK MANAGEMENT METHOD AND HOST FOR ELECTRONIC STORAGE DEVICE

(71) Applicant: MediaTek Singapore Pte. Ltd., Singapore (SG)

(72) Inventors: Jiajie Hao, Hefei (CN); Kuo-Hung Wang, Tainan (TW); Liang Li, Anhui (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/273,083

(22) Filed: Feb. 11, 2019

(65) Prior Publication Data

US 2019/0369919 A1 Dec. 5, 2019

(30) Foreign Application Priority Data

May 29, 2018 (CN) .......................... 201810534252.0

(51) Int. Cl.
- *G06F 9/44* (2018.01)
- *G06F 3/06* (2006.01)
- *G06F 9/48* (2006.01)
- *G06F 13/18* (2006.01)

(52) U.S. Cl.
CPC ............ *G06F 3/0659* (2013.01); *G06F 3/061* (2013.01); *G06F 3/067* (2013.01); *G06F 9/4881* (2013.01); *G06F 13/18* (2013.01)

(58) Field of Classification Search
CPC ........ G06F 3/0659; G06F 3/061; G06F 3/067; G06F 9/4881; G06F 13/18
See application file for complete search history.

(56) References Cited

U.S. PATENT DOCUMENTS

| | | | | |
|---|---|---|---|---|
| 2006/0288349 A1* | 12/2006 | Zimmer | ................ | G06F 9/4893 718/107 |
| 2008/0307424 A1* | 12/2008 | Xu | .......... | H04L 41/00 718/102 |
| 2009/0089784 A1* | 4/2009 | Walters | ................ | G06F 9/4881 718/102 |
| 2012/0131095 A1* | 5/2012 | Luna | ....................... | H04L 67/04 709/203 |
| 2014/0259018 A1* | 9/2014 | Jain | ....................... | G06F 9/4881 718/102 |
| 2015/0074294 A1* | 3/2015 | Shacham | .............. | G06F 3/0679 710/5 |

FOREIGN PATENT DOCUMENTS

| | | |
|---|---|---|
| CN | 103677665 A | 3/2014 |
| TW | 201511008 A | 3/2015 |
| TW | 201523271 A | 6/2015 |
| TW | 201738730 A | 11/2017 |

* cited by examiner

*Primary Examiner* — Hang Pan

(74) *Attorney, Agent, or Firm* — Winston Hsu

(57) ABSTRACT

A task management method is disclosed. The method includes sending a query command by a host to an electronic storage device at a variable interval to determine a status of a task queue of the electronic storage device; obtaining a response information. The response information includes a status of the task queue, and the status of the task queue includes an information about whether a task preparation in the task queue is to be completed.

10 Claims, 10 Drawing Sheets

TASK MANAGEMENT METHOD AND HOST FOR ELECTRONIC STORAGE DEVICE

BACKGROUND

The present invention relates to the field of electronic storage devices, and in particular, to a task management method and a host of an electronic storage device.

A portion of the electronic storage device is equipped with a task queue that allows the electronic storage device to arrange multiple data transmission requests from its host. For example, for a storage technology conforming to the eMMC5.1 standard proposed by the Joint Commission on Electronic Devices Engineering (JEDEC), multiple task requests can be sent to a storage device by a host through a communication circuit, and the current task can be internally processed by the electronic storage device while the other tasks are being processed. After the pre-processing is completed, the task is ready to be completed, and data can be carried by the host when the read-write channel is not occupied, thereby reducing the waiting time in the process. Generally, the preparation status of each task in the task queue of the electronic storage device is periodically queried by the host at a fixed interval, or a single query is performed by the host for the task preparation before the data transmission is completed.

In the practice of the prior art, inventors of the present invention find that, because the tasks in the task queue of the electronic storage device are periodically queried by the host at a fixed interval, in some cases, the query interval is too long and the preparation of the task cannot be timely known by the host. This condition results in an increase in latency, while in other cases, a short query interval can result in a waste of data bus transmission capability between the host and the electronic storage device.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure proposes a number of designs, schemes, techniques, apparatuses and methods as solutions to address the aforementioned challenges.

In one aspect, a technical solution adopted by the present invention is to provide a task management method of an electronic storage device, and the task management method comprises: send a query command by a host to the electronic storage device at a variable interval to determine a status of a task queue of the electronic storage device; obtaining a response information including the status of the task queue, wherein the status of the task queue comprises an information about whether a task preparation in the task queue is to be completed.

In one aspect, another technical solution adopted by the present invention is to provide a task management method of an electronic storage device, and the task management method comprises: sending a task by a host to the electronic storage device; determining whether a data transmission is being performed between the host and the electronic storage device; and when the data transmission is being performed between the host and the electronic storage device, determining a completion time of the data transmission between the host and the electronic storage device, and when the data transmission is completed, immediately sending a query command to the electronic storage device to determine a status of a task queue of the electronic storage device.

In one aspect, another technical solution adopted by the present invention is to provide a host, and the host comprises: a host controller; and a communication circuit, coupled to the host controller and utilized for causing the host controller to communicate with an external storage device, wherein the host controller is utilized for sending a query command to the external electronic storage device at a variable interval to determine a status of a task queue of the electronic storage device, and obtaining a response information including the status of the task queue, wherein the status of the task queue comprises an information about whether a task preparation in the task queue is to be completed.

These and other objectives of the present invention will no doubt become obvious to those of ordinary skill in the art after reading the following detailed description of the preferred embodiment that is illustrated in the various figures and drawings.

DETAILED DESCRIPTION

The technical solutions in the embodiments of the present invention are clearly and completely described in the following with reference to the accompanying drawings in the embodiments of the present invention. It is obvious that the described embodiments are only a part of the embodiments of the present invention, but not all of the embodiments. All other embodiments obtained by those skilled in the art according to the embodiments of the present invention without creative efforts are within the scope of the present invention.

Figure 1:
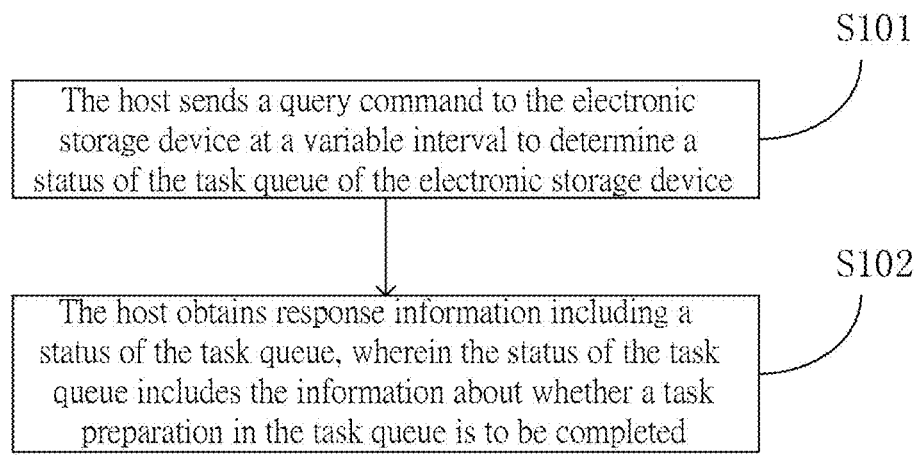
FIG. 1 is a schematic flowchart diagram showing a task management method of an electronic storage device according to an embodiment of the invention.

Please refer to FIG. 1. FIG. 1 is a schematic flowchart diagram showing a task management method of an electronic storage device according to an embodiment of the invention. The method comprises:

S101: The host sends a query command to the electronic storage device at a variable interval to determine a status of the task queue of the electronic storage device.

In this embodiment, it can be understood that at least one task has been created by the host and sent to the electronic storage device, and then the task is queued in the electronic storage device. The task queue is utilized to store related information of the task, and can be implemented by software, hardware or a combination of the software and the hardware. After these tasks have been received, these tasks are preprocessed in the electronic storage device to prepare for subsequent execution. In order to understand the preparation of these tasks, the host sends a query command to the electronic storage device at variable intervals in the step S101 to determine the status of the task queue of the electronic storage device. The query command can be a specific data format, depending on the technical standards used by the electronic storage device. In some embodiments, the host can be configured to comply with the Embedded Multimedia Card (eMMC) standard to send signals to the electronic storage device and receive signals from the electronic storage device. In this case, the query command may be the SEND_QUEUE_STATUS (Transmission Queue Status) command CMD13 from the host to the electronic storage device. It will be understood that the host can also be set to comply with other memory standards, in which case the query commands are determined according to corresponding commands in the respective standards.

Optionally, the variable interval may be set to zero according to different requirements, that is, a query command can be sent to the electronic storage device uninterruptedly by the host.

A query command is continuously sent to the electronic storage device to know when a task preparation in the task queue is to be completed, and the transmission interval of the query command is variable. The variable interval may be adjusted by the host each time the task is sent, or may be dynamically adjusted during the preparation of the task by the electronic storage device. The variable interval may be adjusted according to the amount, priority, importance, or other factors of the task (for example, the load of the data bus between the host and the electronic storage device), as will be described later. It should be understood that data may be transmitted between the host and the electronic storage device, and the operation of issuing a query command can be occurred before, after, or during data transfer.

S102: Response information including a status of the task queue is obtained by the host, wherein the status of the task queue includes the information about whether a task preparation in the task queue is to be completed.

After the query command from the host is received by the electronic storage device, the corresponding response information is sent. The response information contains the status of the task queue. After the host obtains the response information, the host can obtain which tasks in the task queue are ready to be completed and which tasks are not ready according to the status of the electronic storage device task queue.

The present invention can flexibly select the interval at which the query command is send according to actual needs by sending a query command to the electronic storage device at variable intervals. Therefore, by implementing the present invention, it is possible to improve the efficiency of the host acquiring the task preparation completion information, and the delay of the data transmission task between the host and the electronic storage device can be reduced, and the data bus between the host and the electronic storage device can be used more efficiently.

Figure 2:
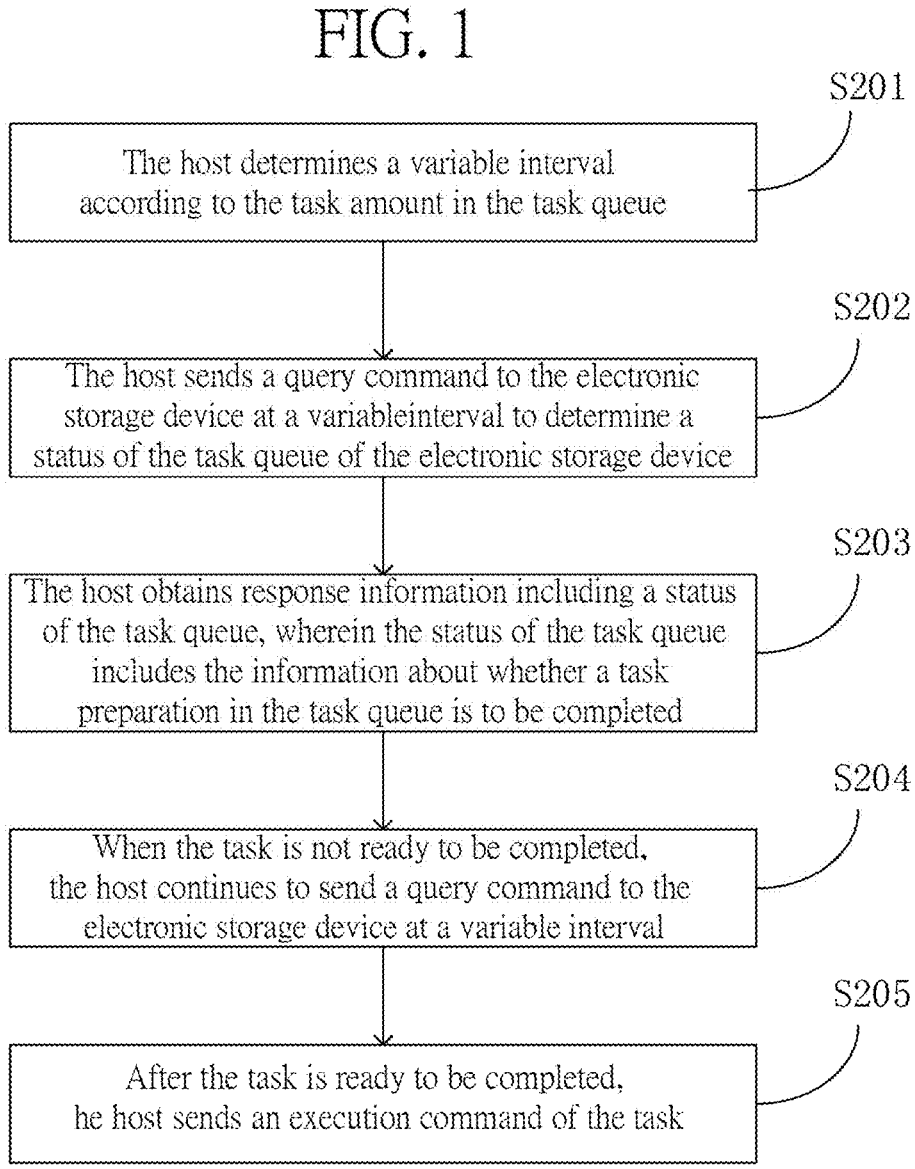
FIG. 2 is a schematic flowchart diagram showing a task management method of an electronic storage device according to another embodiment of the present invention.

Please refer to FIG. 2. FIG. 2 is a schematic flowchart diagram showing a task management method of an electronic storage device according to another embodiment of the present invention. The method comprises:

S201: The host determines a variable interval according to the task amount in the task queue.

In the step S201, the host first determines a variable interval according to the task amount in the task queue.

In some embodiments, when the more the task amount in the task queue is, the shorter the variable interval can be determined; and when the fewer the task amount in the task queue is, the longer the variable interval can be determined. Alternatively, the variable interval can be inversely proportional to the task amount in the task queue, for example, a variable interval=standard fixed interval/un-ready task count. Alternatively, variable interval=non-standard interval/un-ready task count. It will be understood by those skilled in the art that the standard interval may be an interval specified according to a memory protocol/standard, or an interval specified by the memory and/or the host manufacturer in the device specification. The non-standard interval may be an interval reference value set by the user according to experience or hardware or environmental conditions, or may be set according to the distribution of the transmission address or the relevance of the address. Of course, the user may also determine the interval according to other factors.

In other embodiments, a corresponding interval may be allocated to the task quantity in the task queue, for example, the interval can be 1 ms when the task queue contains one task, and the interval can be 0.5 ms when the task queue contains two or three tasks. The interval can be 0.2 ms when there are four to ten tasks in the task queue. Please note that the above embodiment is only for an illustrative purpose and is not meant to be a limitation of the present invention. In actual situations, other correspondences may be set for the task amount in the task queue and the query interval, and the query interval may also have other values and orders of magnitude.

S202: The host sends a query command to the electronic storage device at a variable interval to determine a status of the task queue of the electronic storage device.

S203: The host obtains response information including a status of the task queue, wherein the status of the task queue includes the information about whether a task preparation in the task queue is to be completed.

In some embodiments, after the host obtains the response information, the host can perform a corresponding operation according to the status of the task queue comprised in the response information, for example, as shown in the step S204 and the step S205.

S204: When the task is not ready to be completed, the host continues to send a query command to the electronic storage device at a variable interval.

If there are tasks in the task queue that are not ready to be completed, the host may continue to send query commands to the electronic storage device at variable intervals to determine when these tasks are ready to be completed.

S205: After the task is ready to be completed, the host sends an execution command of the task.

After the host obtains the information that the task is ready to be completed according to the response information, the host may send an execution command of the task, thereby executing the task. Optionally, the execution commands of the task may comprise reading data and writing data. Alternatively, in some embodiments, the execution command may also be a command to abandon the task. It can be understood that the execution command of the abandonment task may also be sent during the task preparation, thereby causing the electronic storage device to stop the task preparation process.

It should be noted that after an execution command for the task has been sent, in some embodiments the electronic storage device may immediately respond to the execution command and perform the corresponding operation, while in other embodiments, the electronic storage device has an ongoing task, such as the storage device is transferring data to the host to perform a read/write operation of the previous task. At this time, the electronic storage device can wait until the execution of the ongoing task is completed, and then execute the corresponding execution command.

Figure 3:
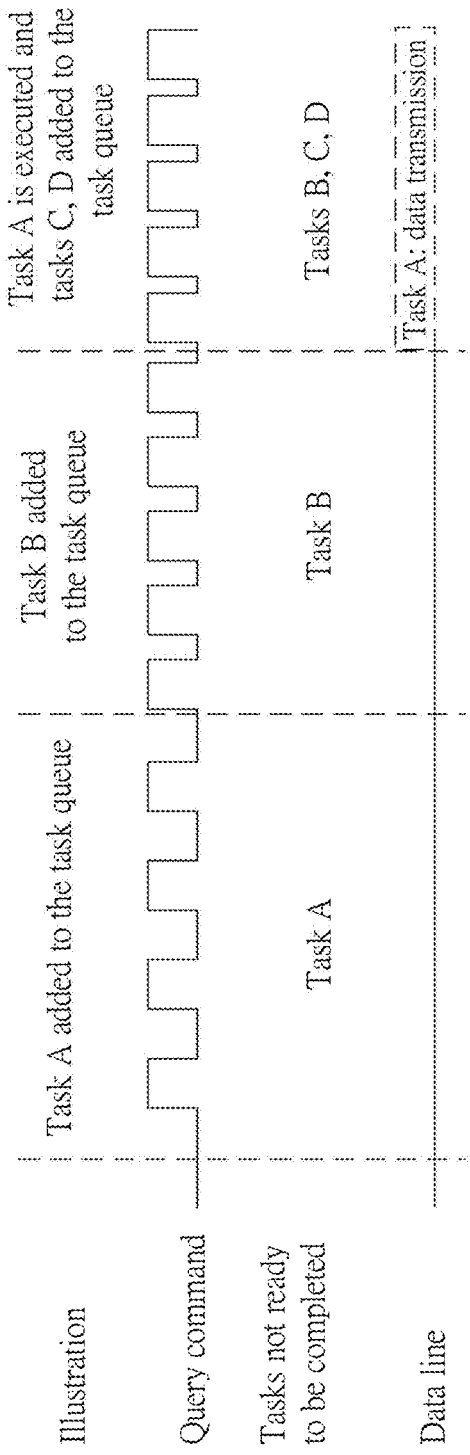
FIG. 3 is a diagram showing signal waveforms of the query command according to the embodiment shown in FIG. 2.

Take the example shown in FIG. 3 as an example. In the first phase, the tasks not ready to be completed in the task queue only comprise task A. At this time, the intervals of the query commands sent by the host are relatively large. In the second phase, task B is added to the task queue, and the intervals of the query commands sent by the host is reduced. In the third stage, the task A is ready to be completed, but the tasks C and D are added to the task queue, and thus the intervals of the query commands sent by the host is further reduced. It should be noted that, as previously mentioned, during the execution of task A (that is, during the data transmission), the host can be dynamically set to send or not to send query commands according to different requirements.

According to this embodiment, when there are multiple tasks in the task queue, the frequency at which the host sends the query command becomes high, such that the host can understand the information of the task preparation completion as soon as possible, and start to perform the task preparation, thereby reducing the waiting latency of the system.

Figure 4:
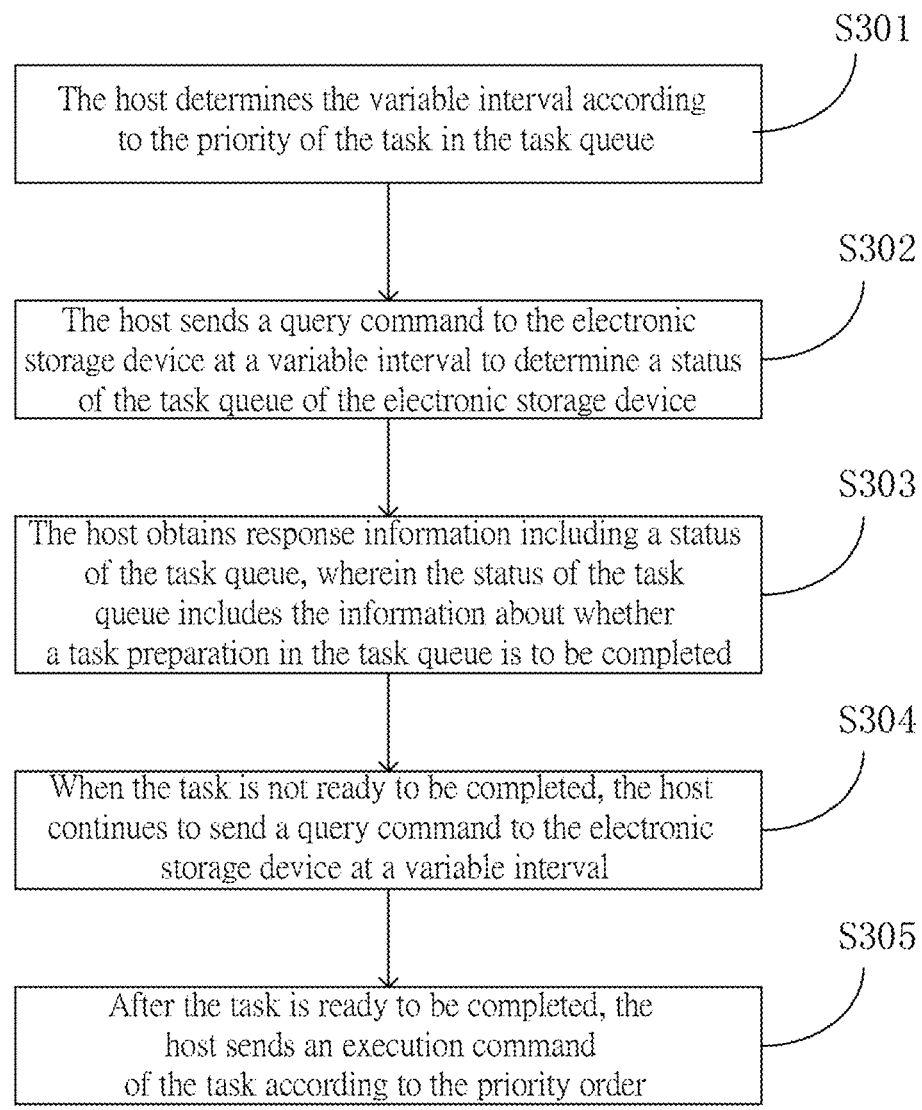
FIG. 4 is a schematic flowchart diagram showing a task management method of an electronic storage device according to another embodiment of the present invention.

Please refer to FIG. 4. FIG. 4 is a schematic flowchart diagram showing a task management method of an electronic storage device according to another embodiment of the present invention. The method comprises:

S301: The host determines the variable interval according to the priority of the task in the task queue.

In the step S301, the host firstly determines a variable interval according to the priority of the tasks in the task queue.

In some embodiments, when the higher the priority of the task is, the shorter the variable interval can be determined; and when the lower the priority of the task, the longer the variable interval can be determined. For the case wherein there is only one task in the task queue, the variable interval can be determined according to the priority of the task. For the case wherein there are multiple tasks in the task queue, the variable interval can be determined according to the priority of the task with the highest priority or the average level of all the task priorities.

In some embodiments, the priority of the task can also be assigned a corresponding interval, for example, 1 ms for the low priority tasks, 0.5 ms for the medium priority tasks, 0.2 ms for the high priority tasks, etc. Please note that the above embodiment is only for an illustrative purpose and is not meant to be a limitation of the present invention. In the actual situation, other correspondences can be set for the priority of the task in the task queue and the query interval, and the query interval can also have other values and orders of magnitude. Those skilled in the art can understand that the query intervals of different priority tasks may be determined according to the storage protocol/standard specification, the specification of the device manufacturer's storage device, the experience value obtained from the electronic storage device analysis experiment, or other factors.

Optionally, the priority of a task may be determined according to the task priority specified in the memory standard, such as memory standards such as eMMC, NAND, UFS, and SSD. Taking the eMMC standard as an example, the host can define the priority of the task as 1 (high) or 0 (simple) in the command CMD44.

Optionally, the priority of a task may be determined according to the task priority specified by the operating system kernel, such as Windows, Linux, and Mac operating systems. Taking the Linux system as an example, the kernel-specified task priorities may comprise IOPRIO_CLASS_RT (high priority), IOPRIO_CLASS_BE (medium priority), and IOPRIO_CLASS_IDLE (low priority).

Optionally, the priority of a task may be determined according to the priority specified by the application scenario. For example, tasks related to high-efficiency application scenarios can be defined as high priority, such as video playback, games, telephony, text messaging, and video playback functions, etc., while tasks related to inefficient application scenarios can be defined as low priority, such as electronic books and notepads, etc.

Optionally, the priority of a task may be determined according to the task priority specified by the hardware type. For example, tasks associated with communication hardware can be defined as high priority.

S302: The host sends a query command to the electronic storage device at a variable interval to determine a status of the task queue of the electronic storage device.

S303: The host obtains response information including a status of the task queue, wherein the status of the task queue includes the information about whether a task preparation in the task queue is to be completed.

S304: When the task is not ready to be completed, the host continues to send a query command to the electronic storage device at a variable interval.

S305: After the task is ready to be completed, the host sends an execution command of the task according to the priority order.

When multiple tasks comprised in the task queue are ready to be completed, the host may preferentially send execution commands of the tasks with higher priority according to the priority order, and then sequentially send execution commands of the tasks with medium priority and low priority. Accordingly, the electronic storage device can preferentially perform high priority tasks.

Figure 5:
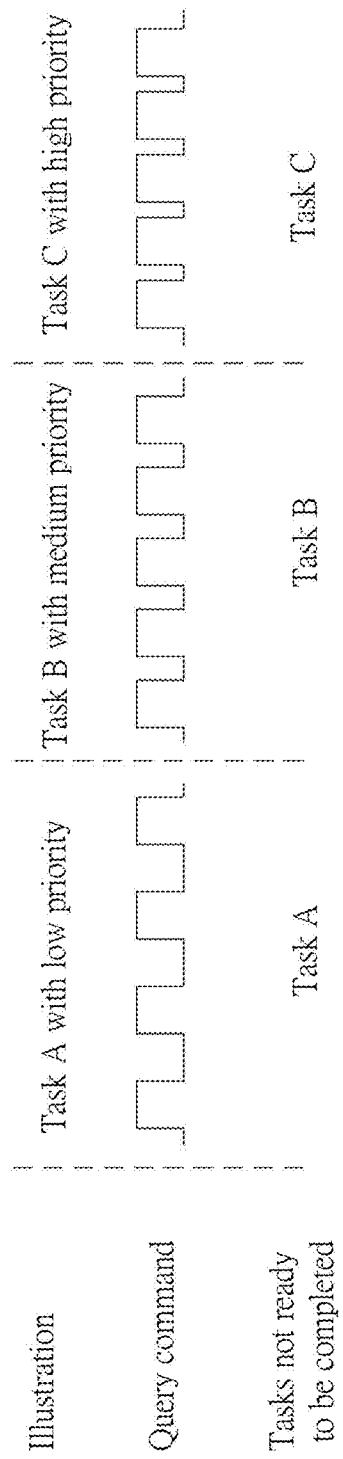
FIG. 5 is a diagram showing signal waveforms of the query command according to the embodiment shown in FIG. 4.

Take the embodiment shown in FIG. 5 as an example. When the task A with low priority in the task queue is an incomplete task (the tasks not ready to be completed), the interval of the query commands sent by the host is larger. When the task B with medium priority in the task queue is an incomplete task, the interval of query commands sent by the host is smaller. When the task C with high priority in the task queue is an incomplete task, the interval of query commands sent by the host is the smallest.

According to this embodiment, when there is a high priority task in the task queue, the frequency at which the host sends the query command becomes high, so that the host can know the information of the high priority task preparation completion as soon as possible, and start the preparation to perform the high priority task. Since the high priority tasks are often mission-critical tasks or steps necessary to implement system functions, reducing the preparation time for the high-priority tasks can reduce the system latency and improve the user experience.

In another embodiment, when data transmission is in progress between the host and the electronic storage device, the host may determine a variable interval according to the type of task corresponding to the data transmission. For example, when the ongoing data transmission is an erase operation, the host can set the variable interval to the second (s) level, for example, is since the host can estimate the erase operation to take about 10 minutes. In contrast, if the ongoing data transmission is a read operation of the same address, the host can set the variable interval to the millisecond (ms) level, for example, 1 ms or 10 ms, for the read operation takes less time.

In another embodiment, the host can also dynamically adjust the variable interval according to the operation mode of the host. For example, in a scenario wherein the power is concerned, when the host is in the power saving mode, or when the power is insufficient or below a threshold, the host can increase the variable interval to reduce the consumption of power. When the host is not in the power saving mode, the host can shorten the variable interval.

In another embodiment, the host can determine the variable interval according to the distribution of the transmission address or the relevance of the transmission address. For example, the host can set the variable interval to be shorter when the transmission address of the task being prepared is close to (for example, adjacent to) the transmission address of the task being transmitted or previously transmitted, otherwise the variable interval will be set to be longer.

Figure 6:
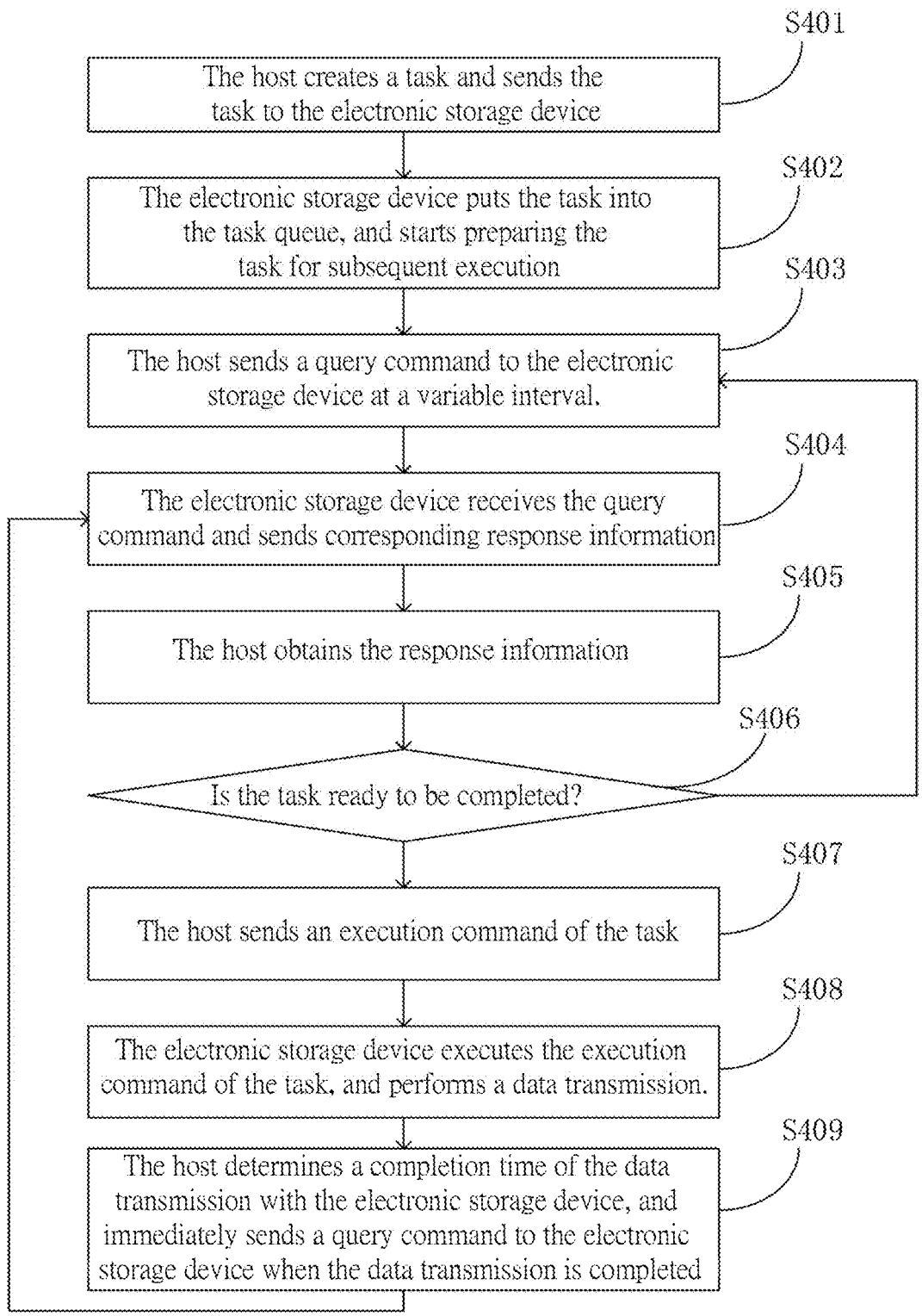
FIG. 6 is a schematic flowchart diagram showing a task management method of an electronic storage device according to another embodiment of the present invention.

Please refer to FIG. 6. FIG. 6 is a schematic flowchart diagram showing a task management method of an electronic storage device according to another embodiment of the present invention. The method comprises:

S401: The host creates a task and sends the task to the electronic storage device.

S402: The electronic storage device puts the task into the task queue, and starts preparing the task for subsequent execution.

S403: The host sends a query command to the electronic storage device at a variable interval.

S404: The electronic storage device receives the query command and sends corresponding response information.

S405: The host obtains the response information.

S406: According to the response information, the host acquires information about whether the task is ready to be completed. When the task preparation is not completed, the process returns to the step S403 to continue to send the query command to the electronic storage device at the variable intervals. When the task preparation is completed, the process goes to the step S407.

S407: The host sends an execution command of the task.

S408: The electronic storage device executes the execution command of the task, and performs a data transmission.

S409: The host determines a completion time of the data transmission, and immediately sends a query command to the electronic storage device when the data transmission is completed. Then, the process returns to the step S404, and the electronic storage device receives the query command again and sends corresponding response information.

Figure 7:
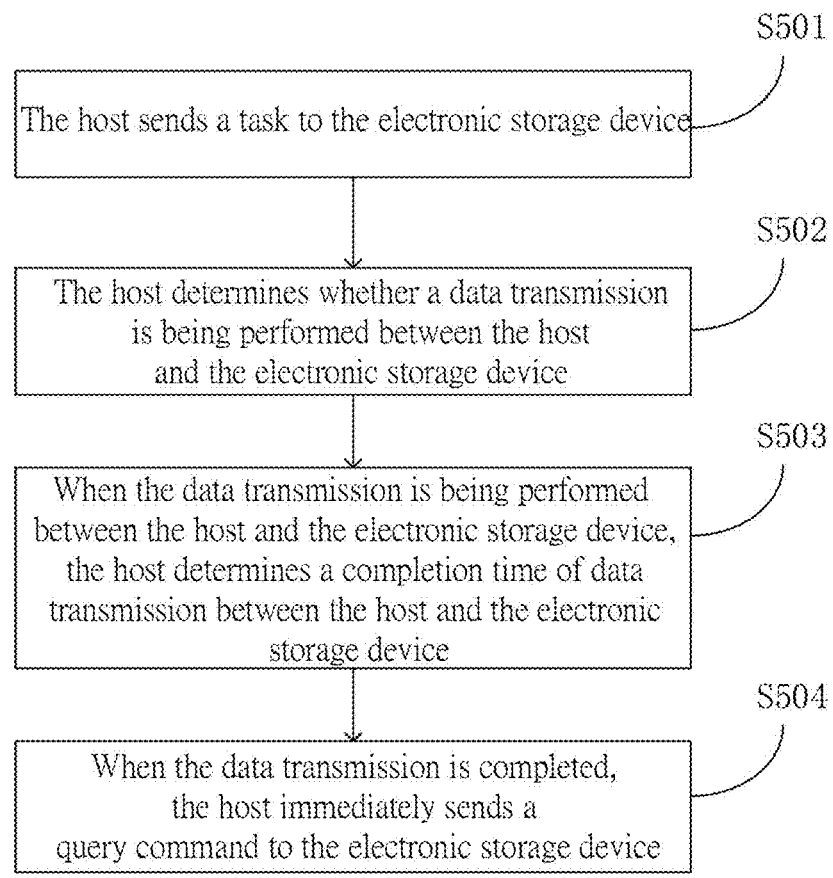
FIG. 7 is a schematic flowchart diagram showing a task management method of an electronic storage device according to another embodiment of the present invention.

Please refer to FIG. 7. FIG. 7 is a schematic flowchart diagram showing a task management method of an electronic storage device according to another embodiment of the present invention. The method comprises:

S501: The host sends a task to the electronic storage device.

S502: The host determines whether a data transmission is being performed between the host and the electronic storage device.

S503: When the data transmission is being performed between the host and the electronic storage device, the host determines a completion time of data transmission between the host and the electronic storage device.

In this case, the data transmission is being performed between the host and the electronic storage device. At this time, the host may not send a query command to the electronic storage device, but determine the completion time of the current data transmission. Optionally, the completion time may be calculated by the electronic storage device, or may be calculated by the host according to factors such as the size of the task, the processing speed of the electronic storage device, and/or the transmission capability of the communication circuit when transmitting the command for executing the task. Alternatively, the completion time can also be obtained directly by the host and/or storage device by detecting the completion of the data transmission.

S504: When the data transmission is completed, the host immediately sends a query command to the electronic storage device to determine the status of the task queue.

In this embodiment, by querying the status of the task queue immediately after the data transmission is completed, the waiting delay of the query operation can be reduced. Therefore, the present embodiment improves the working efficiency of the electronic storage device.

Figure 8:
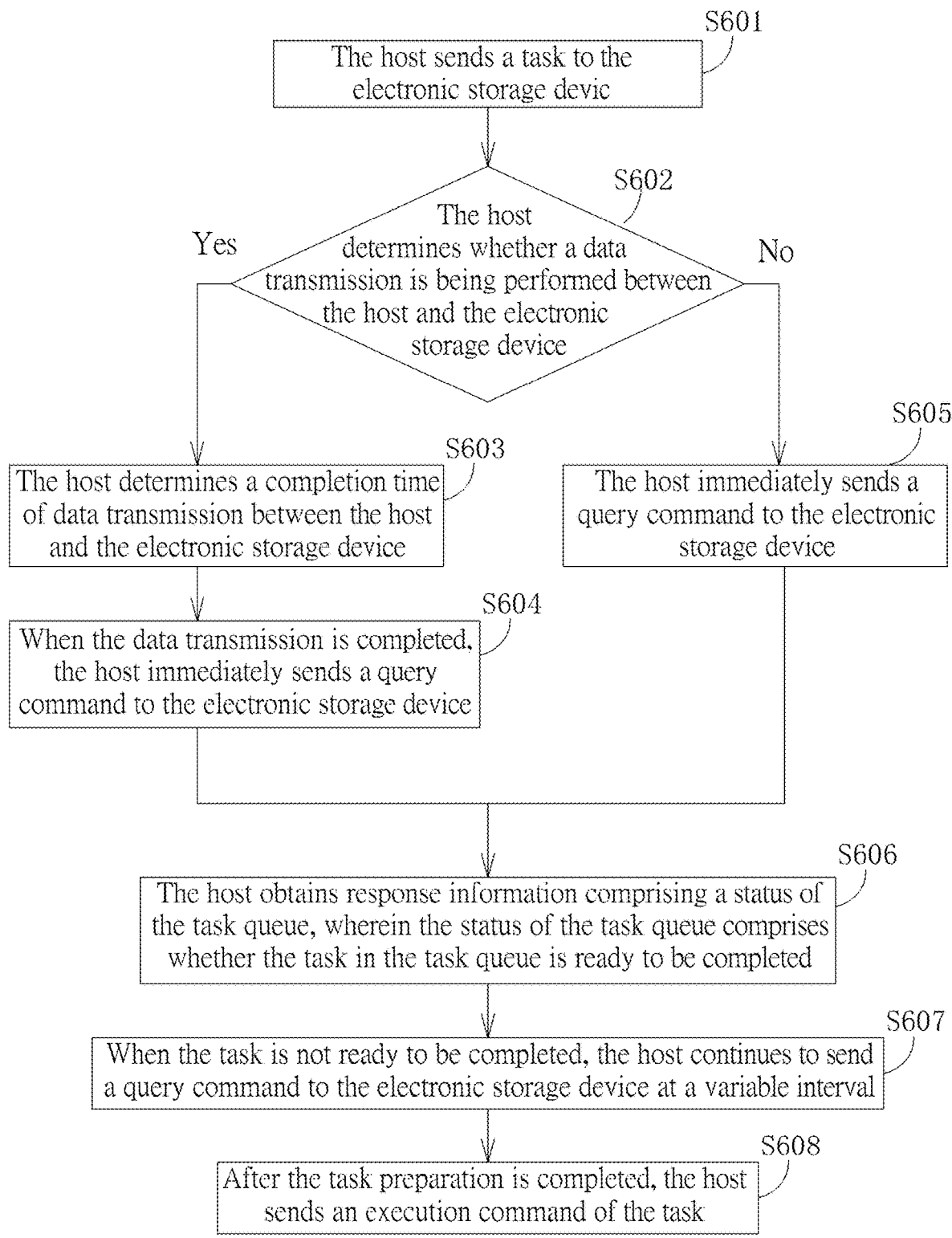
FIG. 8 is a schematic flowchart diagram showing a task management method of an electronic storage device according to another embodiment of the present invention.

Please refer to FIG. 8. FIG. 8 is a schematic flowchart diagram showing a task management method of an electronic storage device according to another embodiment of the present invention. The method comprises:

S601: The host sends a task to the electronic storage device.

S602: The host determines whether a data transmission is being performed between the host and the electronic storage device. If yes, then go to the step S603, and if no, then go to the step S605.

S603: The host determines a completion time of data transmission between the host and the electronic storage device.

S604: When the data transmission is completed, the host immediately sends a query command to the electronic storage device.

The steps S603 and S604 are similar to the foregoing steps S503 and S504, and are not described herein again.

S605: The host immediately sends a query command to the electronic storage device.

In this case, since there is no ongoing data transmission between the host and the electronic storage device, the host can immediately send a query command to the electronic storage device without waiting for a query interval.

S606: The host obtains response information comprising a status of the task queue, wherein the status of the task queue comprises whether the task in the task queue is ready to be completed.

S607: When the task is not ready to be completed, the host continues to send a query command to the electronic storage device at a variable interval.

S608: After the task preparation is completed, the host sends an execution command of the task.

Figure 9:
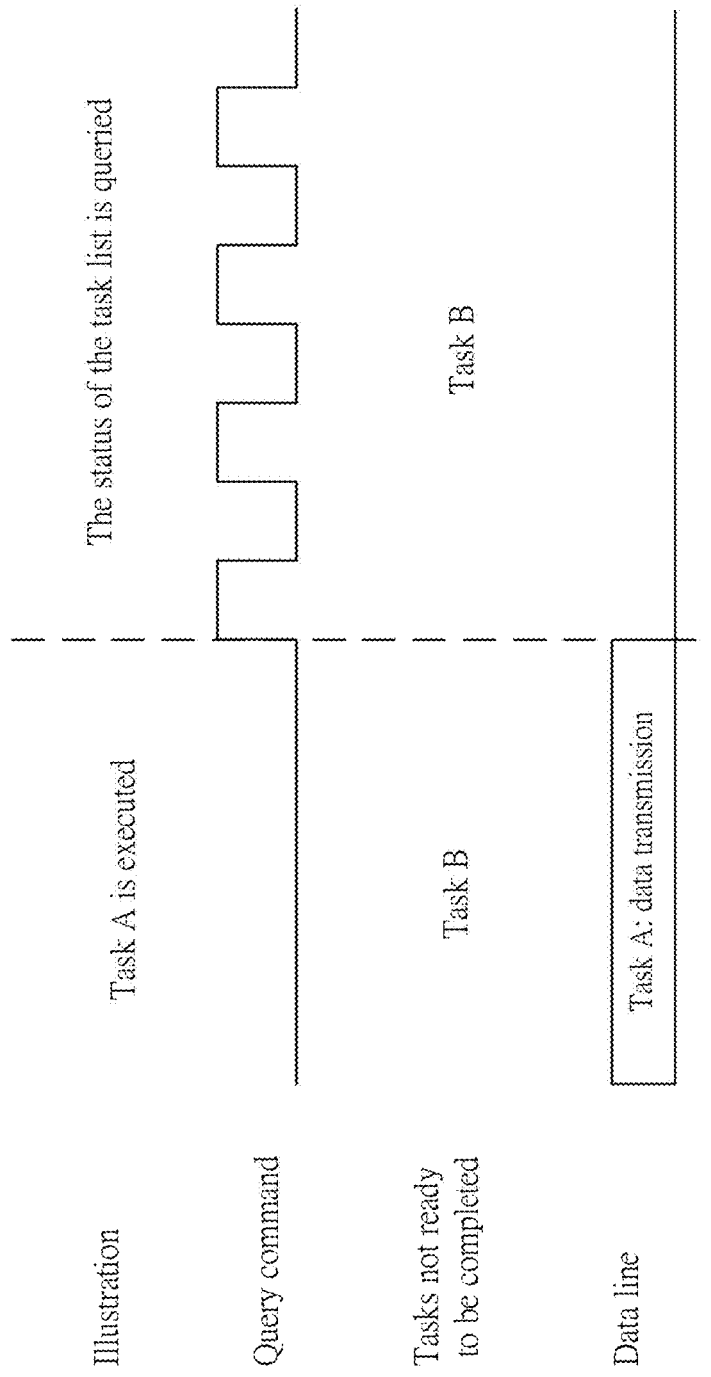
FIG. 9 is a diagram showing signal waveforms of the query command according to the embodiment shown in FIG. 8.

As shown in FIG. 9, in the first phase, the task A is being performed and the data is transmitted between the host and the electronic storage device, and the task B is hung in the task queue. After the data transmission of the task A is completed, the host immediately starts sending a query command to the electronic storage device to query the preparation status of task B without waiting for an interval. Similarly, the interval at which the host sends query commands to the electronic storage device is variable.

It will be understood that in the event that an existing task is being executed (data transmission in progress), the host may not send a query command, or the host may still send the query command at the variable intervals as described in the previous embodiments. For example, in the case wherein only one task can be executed at a time, when data transmission has been performed, even if another task is ready to be completed, the status of the task queue may not be queried; and in the case wherein multiple tasks may be executed in parallel, even if the data is already transmitted, another task can be performed, and thus the status of the task queue can be continuously queried.

In this embodiment, by querying the status of the task queue immediately after the data transmission is completed, the waiting delay of the query operation can be reduced. Therefore, the present embodiment improves the working efficiency of the electronic storage device.

Figure 10:
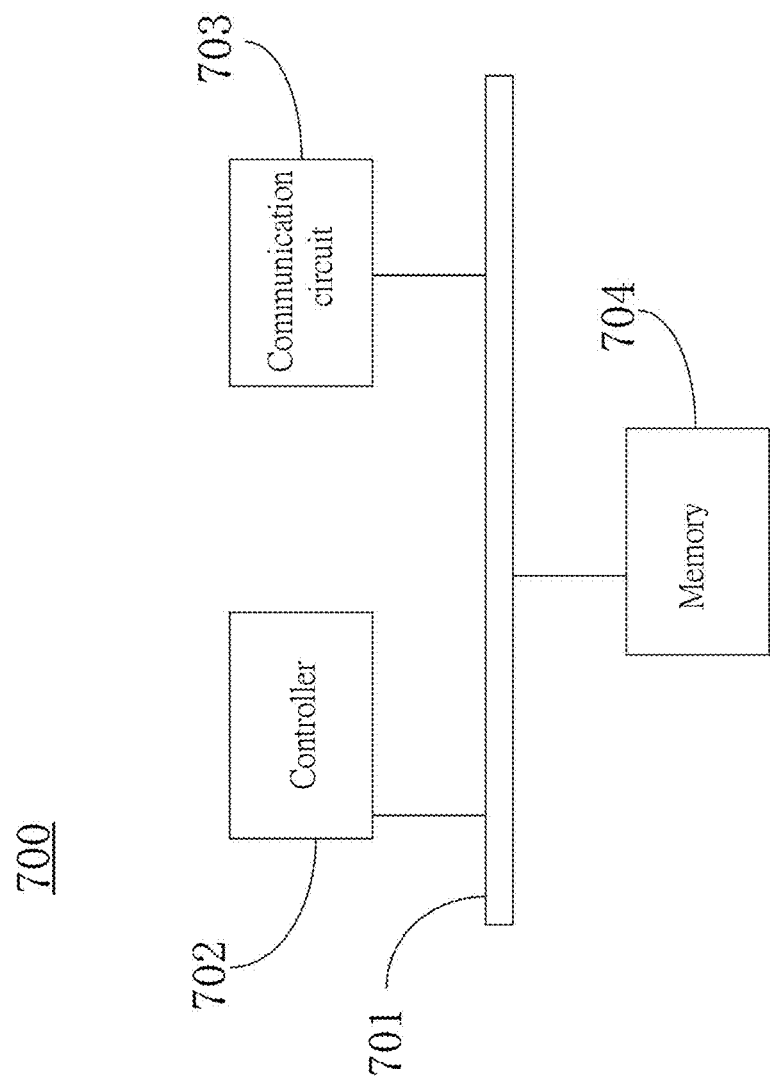
FIG. 10 is a schematic diagram showing an exemplary structure of a host according to an embodiment of the invention.

Please refer to FIG. 10. FIG. 10 is a schematic diagram showing an exemplary structure of a host 700 according to an embodiment of the invention. The host 700 comprises a bus 701, a controller 702, a communication circuit 703, and a memory 704. The controller 702, the communication circuit 703, and the memory 704 can be coupled via the bus 701.

The communication circuit 703 is utilized for causing the controller 702 to communicate with an external storage device. The program data is stored in the memory 704, and can be loaded by the controller 702 and the task management method of the electronic storage device of any one of the above embodiments is executed. It can be understood that in some other embodiments, the memory 704 may be disposed in the same physical device by different controllers 702, but the method of any one of the above embodiments can be performed by combining the host 700 with a network.

Figure 11:
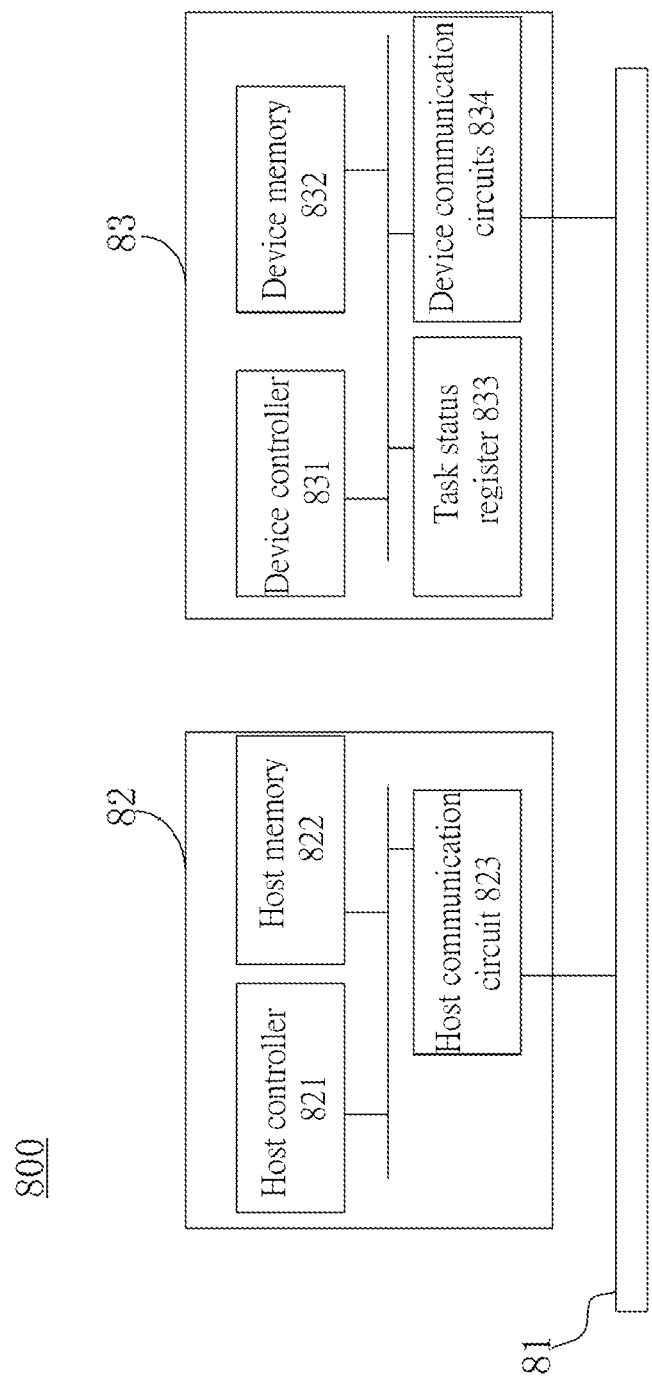
FIG. 11 is a schematic diagram showing an exemplary structure of an electronic device according to an embodiment of the invention.

Please refer to FIG. 11. FIG. 11 is a schematic diagram showing an exemplary structure of an electronic device 800 according to an embodiment of the invention. The electronic device 800 comprises a bus 81, a host 82, and a storage device 83.

The host 82 comprises a host communication circuit 823 utilized for the communication, a host memory 822 utilized for storing the program commands, and a host controller 821 utilized for executing the program commands, and the electronic storage device 83 comprises a device communication circuits 834 utilized for communication, a device memory 832 utilized for storing the program commands, a device controller 831 utilized for executing the program commands, and a task status register 833 utilized for storing the task queues. The host 82 and the electronic storage device 83 can implement any of the task management methods described above by executing the program commands, respectively.

The host 700 as shown in FIG. 10 and the electronic device 800 as shown in FIG. 11 may be provided or integrated in any electronic device using the electronic storage device, such as a computer, a mobile phone, a personal digital assistant, a multimedia player, a set top box, a navigation equipment, or a television, etc.

The functions described in the above embodiments may be stored in a device having a storage function if implemented in software and sold or used as a stand-alone product, that is, the present invention also provides a storage device storing the program. The program data in the electronic storage device can be executed to implement the task management method of the electronic storage device in the above embodiments. The electronic storage device includes but not limited to a USB flash drive, an optical disk, a server, and a hard disk, etc. For example, the electronic storage device may be a storage device embedded in the host or an external storage device connected to the host.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A task management method of an electronic storage device, comprising:
   sending a query command to the electronic storage device at a variable interval by a host to determine a status of a task queue of the electronic storage device, and the variable interval is associated at least to a task amount in the task queue;
   determining the variable interval according to the task amount in the task queue, wherein the more the task amount in the task queue is, the shorter the variable interval is determined; and the fewer the task amount in the task queue is, the longer the variable interval is determine; and
   obtaining a response information including the status of the task queue, wherein the status of the task queue comprises an information about whether a task preparation in the task queue is to be completed;
   wherein the host is arranged to comply with an embedded multimedia card (eMMC) standard to transmit signals to the storage device and receive signals from the storage device.

2. The task management method of the electronic storage device of claim 1, further comprising:
   determining the variable interval further according to a priority order of the task in the task queue.

3. The task management method of an electronic storage device of claim 2, wherein the higher the priority of the task is, the shorter the variable interval is determined; and the lower the priority of the task, the longer the variable interval is determined.

4. The task management method of an electronic storage device of claim 2, wherein:
   the priority order of the task is determined according to the task priority order specified by a memory standard; or
   the priority order of the task is determined according to the task priority order specified by an operating system kernel; or
   the priority order of the task is determined according to the task priority order specified by an application scenario; or the priority order of the task is determined according to the task priority order specified by a hardware type.

5. The task management method of the electronic storage device of claim 2, further comprising:
after the response information indicating that the task preparation is to be completed, sending an execution command of the task according to the priority order.

6. The task management method of the electronic storage device of claim 1, further comprising:
when the response information indicating that the task preparation is not completed, continuously sending the query command to the electronic storage device at the variable interval; or
when the response information indicating that the task preparation is completed, sending an execution command of the task.

7. The task management method of an electronic storage device of claim 6, wherein the execution command of the task comprises reading data, writing data, or discarding tasks.

8. A task management method of an electronic storage device, comprising:
sending a task by a host to the electronic storage device;
determining whether a data transmission is being performed between the host and the electronic storage device; and
when the data transmission is being performed between the host and the electronic storage device, determining a completion time of the data transmission between the host and the electronic storage device, and when the data transmission is completed, immediately sending a query command to the electronic storage device to determine a status of a task queue of the electronic storage device; and
obtaining a response information including the status of the task queue, wherein the status of the task queue comprises an information about whether a task preparation in the task queue is to be completed;
when the response information indicating that the task preparation is not completed, continuously sending the query command to the electronic storage device at a variable interval, and the variable interval is associated at least to a task amount in the task queue;
determining the variable interval according to the task amount in the task queue, wherein the more the task amount in the task queue is, the shorter the variable interval is determined; and the fewer the task amount in the task queue is, the longer the variable interval is determine; and
when the response information indicating that the task preparation is completed, sending an execution command of the task;
wherein the host is arranged to comply with an embedded multimedia card (eMMC) standard to transmit signals to the storage device and receive signals from the storage device.

9. The task management method of the electronic storage device of claim 8, further comprising:
when the data transmission is not performed between the host and the electronic storage device, immediately sending the query command to the electronic storage device.

10. A host, comprising:
a host controller; and
a communication circuit, coupled to the host controller and utilized for causing the host controller to communicate with an external storage device,
wherein the host controller is utilized for sending a query command to the external electronic storage device at a variable interval to determine a status of a task queue of the electronic storage device, and obtaining a response information including the status of the task queue, wherein the status of the task queue comprises an information about whether a task preparation in the task queue is to be completed; and the variable interval is associated at least to a task amount in the task queue; and the host controller is utilized for determining the variable interval according to the task amount in the task queue, wherein the more the task amount in the task queue is, the shorter the variable interval is determined; and the fewer the task amount in the task queue is, the longer the variable interval is determine;
wherein the host is arranged to comply with an embedded multimedia card (eMMC) standard to transmit signals to the storage device and receive signals from the storage device.

* * * * *